United States Patent [19]
Aoki et al.

[11] Patent Number: 5,230,565
[45] Date of Patent: Jul. 27, 1993

[54] PYROMETER AND A METHOD FOR FUSING AN ALUMINA PIPE HAVING A HIGH PURITY

[75] Inventors: Kazuichi Aoki; Yukihiro Saiki, both of Saitama; Kensuke Itoh, Kodaira; Satoshi Nishimura, Kawagoe; Tomosuke Imamura, Saitama, all of Japan

[73] Assignees: Netsushin Co., Ltd.; Snow Brand Milk Products Co., Ltd., both of Japan

[21] Appl. No.: 709,239

[22] Filed: Jun. 3, 1991

[30] Foreign Application Priority Data

Jun. 6, 1990 [JP] Japan ............... 2-146138

[51] Int. Cl.⁵ .................... G01K 7/18; G01K 1/08
[52] U.S. Cl. .......................... 374/185; 374/208
[58] Field of Search ........... 374/185, 179, 139, 181, 374/208, 148; 219/221; 136/234, 230

[56] References Cited
U.S. PATENT DOCUMENTS

| | | | |
|---|---|---|---|
| 3,647,558 | 3/1972 | McMurtry | 136/234 |
| 3,647,559 | 3/1972 | Truppe et al. | 136/234 |
| 3,818,762 | 6/1974 | Kraus et al. | 136/234 |
| 4,377,347 | 3/1983 | Hanmyo et al. | 136/234 X |
| 4,721,534 | 1/1988 | Phillippi et al. | 136/234 |
| 4,724,428 | 2/1988 | Brown, Jr. | 374/178 X |
| 5,069,553 | 12/1991 | Phillippi | 136/234 X |

Primary Examiner—Daniel M. Yasich
Attorney, Agent, or Firm—Dorusso & Loud

[57] ABSTRACT

An improved new type pyrometer and a method for fusing an alumina pipe having a high purity are disclosed. The temperature-measuring portion of the pyrometer includes a protective pipe made of alumina having a purity of at least 99.9% and a temperature-measuring resistance element of a platinum or platinum-rhodium resistance wire and a holding portion made of alumina having a purity of at least 99.9%. Owing to the use of high purity alumina, the platinum or platinum-rhodium resistance wire is not contaminated and has stable temperature characteristics at high temperatures. According to the method of this invention, an end of an alumina pipe having a purity of at least 99.9% can be fused without the aid of any binder by fusing the end while evacuating air from the alumina pipe through its opposite end.

2 Claims, 3 Drawing Sheets

PYROMETER AND A METHOD FOR FUSING AN ALUMINA PIPE HAVING A HIGH PURITY

BACKGROUND OF THE INVENTION

1. Field of the Invention

The present invention relates to an improved pyrometer which is utilizable for the precise measurement of temperatures of materials heated at a temperature higher than 1000° C., such as a molten metal or glass and to a method of fusing a terminal end of an alumina pipe of high purity used, for example, for a pyrometer.

2. Description of the Prior Art

Prior art protective pipes for a platinum or platinum-rhodium wire used for an ordinary pyrometer are predominantly alumina having a purity of at most about 99.7%. In general, the protective pipe is fused on one terminal end to form a closed-end pipe, like a test tube, into which a temperature-measuring resistance element comprising the platinum or platinum-rhodium wire is inserted. Such a conventional alumina protective pipe is formed using silica or the like as a binder. On heating such a pipe at a temperature above 800° C., therefore, a gas is evolved from impurities contained in the alumina and/or the binder, which contaminates the platinum or platinum-rhodium wire to deteriorate its temperature characteristics. If alumina has a purity as high as 99.9% or more, no contaminating gas will be evolved therefrom even on heating it at a temperature above 800° C. On the other hand, when a protective pipe for the temperature-measuring element is to be manufactured from such highly pure alumina, a pipe (tube) having both terminal ends open can easily be manufactured but a pipe having one terminal end closed can hardly be obtained because of lack of any binder incorporated into the alumina. In the event a binder is incorporated into such highly pure alumina, the pipe manufactured therefrom tends to bend at a high temperature and may be broken on rapid heating or cooling. Furthermore, external air intrudes into the pipe creating the possibility that the temperature-measuring element will become contaminated with impurities contained in the air. Even if this problem is overcome by carrying out the process under vacuum, there is a detrimental drawback in that a pipe of a uniform quality with either terminal end closed by fusing cannot be obtained with good reproducibility.

Under the circumstances, there is a great demand to develop a new type pyrometer which overcomes all the drawbacks in the prior art pyrometers by using a highly pure alumina protective pipe free from the fear of contamination.

BRIEF SUMMARY OF THE INVENTION

Accordingly, it is an object of the present invention to provide a new type pyrometer using a platinum or platinum-rhodium temperature- measuring resistance element, which overcomes various drawbacks as seen in the conventional similar pyrometers.

It is another object of the present invention to provide a pyrometer using a platinum or platinum-rhodium resistance element, wherein alumina having a purity as high as 99.9% or more is used to form the protective sheath or "pipe" to prevent the element from any contamination thereby stabilizing its temperature characteristics at high temperatures.

It is still another object of the present invention to provide a method for fusing a terminal end of an alumina pipe having a purity as high as 99.9% or more without using any binder.

Other and further objects, features and advantages of the present invention will become more fully apparent from the following description.

In accordance with the present invention, there is provided a pyrometer which comprises a holding portion provided with a temperature-measuring resistance element and a protective pipe, a terminal end of which is closed by fusing, characterized in that the temperature-measuring resistance element is essentially of platinum or platinum-rhodium resistance wire and that the holding portion and the protective pipe consist essentially of alumina having a purity as high as 99.9% or more.

In accordance with the present invention, there is also provided a method for fusing a terminal end of an alumina pipe having a high purity, which comprises inserting an alumina pipe having a purity as high as 99.9% or more, both ends of which are open, into a holder having an inner diameter larger than the outer diameter of the alumina pipe in such manner that one end of the alumina pipe may be extended for a given length from the holder to form an extended portion, heating the holder externally to maintain the alumina pipe at a predetermined temperature, and thereafter fusing the end of the extended portion of the alumina pipe by heating it with a burner while evacuating the air in the alumina pipe from the other end of the alumina pipe.

It is one of the feature of the present invention that the platinum or platinum-rhodium resistant wire used as the temperature-measuring resistance element is not contaminated and has stable temperature characteristics at a high temperature since the material forming the protective sheath or "pipe" is alumina having a high purity of at least 99.9%.

It is another feature of the present invention that an alumina pipe having a purity as high as 99.9% or more is closed at the end portion, thereof without using any binder, by locally fusing the end portion while evacuating air from the pipe. The method for fusing the terminal end of a high purity alumina pipe without using any binder is applicable, for example, to the manufacture of a protective pipe of a pyrometer with a temperature-measuring resistance element mounted therein.

Further scope of applicability of the present invention will become apparent from the detailed description given hereinafter. However, it should be understood that the detailed description and the specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration, and thus are not limitative of the present invention, and wherein.

DETAILED DESCRIPTION OF THE INVENTION

The meter and display portion 20 of the pyrometer and the measurement principle of the pyrometer of this invention are conventional but the temperature-measuring portion 1 which includes the platinum or platinum-rhodium wire differs in that the protective sheath or pipe is made of alumina having a purity as high as 99.9% or more.

Any type of alumina, e.g. $\alpha$-alumina, $\beta$-alumina and/or $\gamma$-alumina can be used as the sheath material for the pyrometer of this invention provided its purity is at least 99.9%. No limitation exists for the particle size of the alumina. Such alumina is commercially available.

The present invention can more fully be understood from the following description taken in conjunction with the accompanying drawings.

Figure 1:
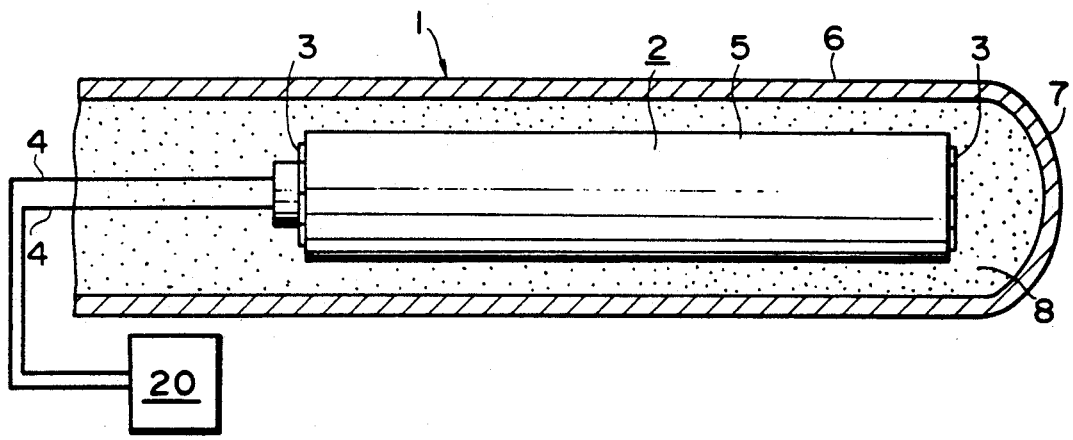
FIG. 1 is a longitudinal cross sectional view showing one example of the pyrometer of this invention including a meter display.

Referring to FIG. 1 fully showing one example of the temperature-measuring portion 1 of the pyrometer of this invention. A temperature-measuring resistant element 2 contains a temperature-measuring resistance wire 3, for example, a platinum or platinum-rhodium wire having a diameter of 0.15 mm. Lead wires are received in a holding portion made predominantly of alumina having a purity as high as 99.9% or more. The protective pipe 6 is made predominantly of alumina having a purity of at least 99.9% and has a closed portion 6 formed at one terminal end by fusing. A powdery material 8 is packed into the space between the protective pipe 6 and the temperature-measuring element 2 for fixing the element 2 in the pipe 6 and is predominantly alumina having a purity of at least 99.9%. The meter and display portion 20 of the pyrometer is connected to the temperature-measuring portion 1 through the lead wires 4.

Figure 2A:
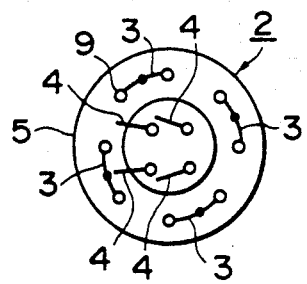
FIGS. 2(a)-2(c) are schematic views of the temperature-measuring resistance element used in the pyrometer of FIG. 1, with FIG. 2(a) showing the front view of element looking from the left side, FIG. 2(b) showing a perspective view of the element looking from the left side, and FIG. 2(c) showing a front view of the element looking from the right side.
Figure 2C:
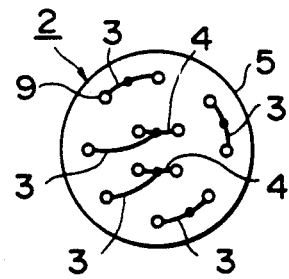
Figure 2B:
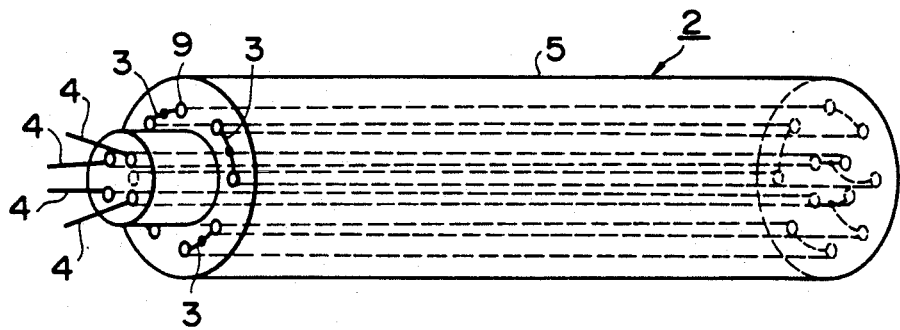

In FIGS. 2(a)-2(c), showing the temperature-measuring resistance element 2 wherein the reference numerals used therein have the same meanings as given in FIG. 1, the platinum or platinum-rhodium wire 3 and the lead wires 4 are connected in series to form a single wire. The connection points are shown by black spots. The reference numeral 9 is a hole formed longitudinally through the holding portion 5 to receive the platinum or platinum-rhodium wire 3a and the lead wire 4. This temperature-measuring resistance element 2 is manufactured by inserting the platinum or platinum-rhodium wire 3 and the lead wires 4 through it slightly beyond holes 9 and welding each pair of the wires 3 and the wires 4 extending from the holes 9 to form a single wire as shown in FIGS. 2(a)-2(c).

The temperature-measuring resistance element 2 thus manufactured is placed in the protective pipe 6 and the powdery material 8 is then charged into the pipe to fix the element whereby the temperature-measuring portion 1 of the pyrometer is complete.

According to the temperature-measuring portion 1 of this structure, all the materials supporting the platinum or platinum-rhodium wire 3 are alumina having a purity of 99.9% or more so that no harmful gaseous substance is evolved even at a high temperature and thus the characteristics of the wire 3 do not fluctuate. The space between the protective pipe 6 and the element 2 need not be filled with the powdery material 8. In this case, the element 2 may be supported within the pipe 6 by one or more O-rings made of alumina having a purity of at least 99.9%.

The protective pipe 6, i.e. a high purity alumina pipe used in the temperature-measuring portion 1, can be manufactured by closing the alumina pipe at one terminal end thereof by fusing, according to a specific method as will be described hereinafter, without the aid of any binder.

Figure 3A:
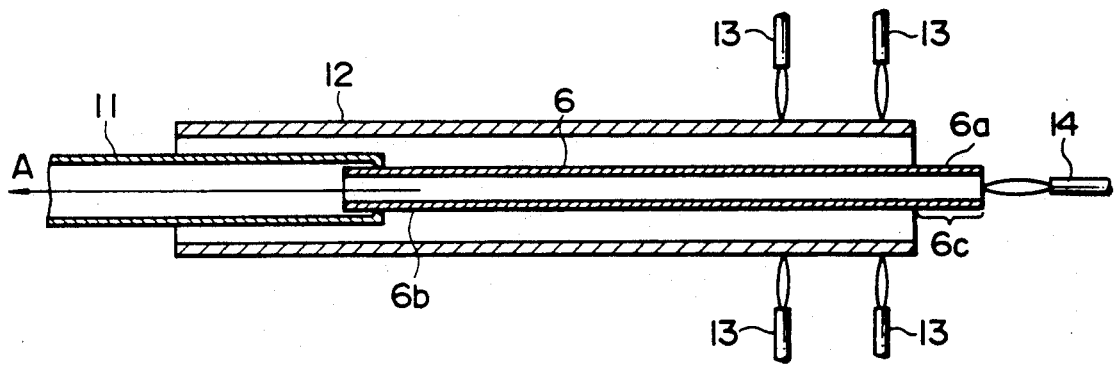
FIGS. 3(a)-3(b) are cross sectional views showing the method for forming a closed portion at the terminal end of a protective pipe made of a high purity alumina containing no binder as shown in FIG. 1.

In FIG. 3(a) showing a method for forming the closed portion at one terminal end of the protective pipe 6 by fusing, the reference numeral 6 has the same meaning as given in FIG. 1, 6a is one terminal open end of the pipe 6, 6b is the other terminal open end of the pipe 6 and is connected to a supporter 11 for the pipe 6. A portion 6c of the pipe 6 extends by a predetermined length from a holder 12 which surrounds and is spaced from the pipe 6 at a distance. A burner 23 is used for heating the holder 12, and a burner 14 is used for heating the terminal end 6a. A plurality of the burners 13 are used for heating the holder 12 externally, thereby indirectly heating the pipe 6 to prevent it from cracking. The burner 14 is used for heating the terminal end 6a of the pipe 6 to form a closed portion by fusing. In general, an ordinary alumina pipe is used for the holder 12 and for the supporter 11, but a pipe made of another material may be used for the supporter 11.

According to the method shown in FIG. 3(a), the pipe 6 is supported at the end 6b by a supporter 11 and then inserted into a holder 12 having a diameter larger than the pipe 6 in such manner that a portion including the end 6a extends by a predetermined length from the holder 12 to form the portion 6c. The end 6a is heated by the burner 14 and at the same time the air in the pipe 6 is evacuated in the direction of A shown by the arrow, while heating the holder 12 externally with plural burners 13 to indirectly heat the pipe 6.

Figure 3B:
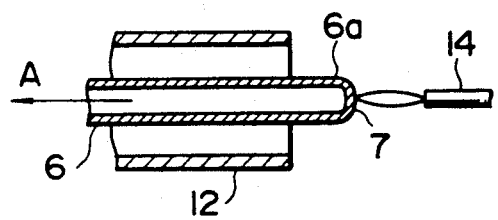

FIG. 3(b) shows the end 6a in this state. By heating the end 6a of the pipe 6 with the burner 14 while evacuating air from the pipe, the alumina at the end 6a forms an annular molten ring and is pulled inward to form a closed portion 7 without using any binder.

Figure 4:
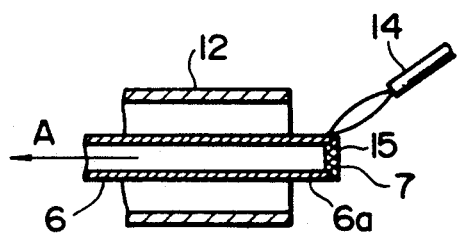
FIG. 4 ia a cross-sectional view showing another method for forming a closed portion at the terminal end of a protective pipe made of a high purity alumina containing no binder.

In FIG. 4 showing another method for forming the closed portion 7, the end 6a of the pipe 6 is covered with an alumina cap 15 having a high purity of at least 99.9% and the end 6a is heated with the burner 14 while evacuating air from the pipe 6 in the direction of A shown by the arrow mark. The cap 15 is fused to the end 6a by welding in this manner to from the closed portion 7 at the end of the pipe.

If the fusing of the pipe 6 at the end 6a is carried out without evacuating air from the pipe, the molten alumina forms on the outside of the pipe 6 so that closing of the pipe 6 at the end 6a becomes impossible. On the other hand, if the welding of the cap 15 is carried out without evacuation of air from the pipe 6, only a superficial part of the cap 15 will be welded so that complete welding of the cap 15 may be impossible and cracks may form during use.

When the welding is carried out while evacuating air from the pipe 6 in the method as shown in FIG. 4, a low pressure is established in the space between the end 6a and the cap 15 so that the heat from the externally heated holder 12 and the flame of the burner 14 are drawn into the space between the end 6a and the cap 15 to transmit the heat to the inside of the cap and the welding can thus be carried out efficiently and quickly to close the pipe 6, by forming the closed portion 7 at the end 6a. This evacuation also serves to prevent the outside of the pipe 6 from any deposition of the molten alumina and thus avoids the need for treatment after the welding.

Using the temperature-measuring portion 1 of the pyrometer thus manufactured, a series of experiments were carried out for checking the temperature characteristics of a temperature-measuring resistance wire. The results of the experiments are shown in the following Examples 1-3 wherein a platinum wire having a diameter of 0.15 mm and an initial resistance value of 100.000Ω/0° C. was used as the temperature-measuring resistance wire.

The above-described platinum wire was heated at 1100° C. for 3 hours and then cooled at 0° C. whereby the resistance value of the wire was measured as 138.5Ω.

The platinum wire subjected to the above heating and cooling treatment was cut into three portions, inserted into three alumina pipes having purities of 99.9%, 99.7% and 99.5%, respectively, heated at 1100° C. and then cooled at 100° C., and the resistance values of the wire thus treated were measured, from which the temperature coefficients were calculated.

EXPERIMENTAL EXAMPLE 1

Using an alumina pipe having a purity of 99.5%, the platinum wire was heated at 1100° C. for 3 hours and the resistance values were measured a first time at 0° C. and 100° C. in the above mentioned manner. The results of the measurements are shown in Table 1 below.

TABLE 1

| Sample No. | Resistance value (Ω) 0° C. | Resistance value (Ω) 100° C. | Temperature coefficient |
|---|---|---|---|
| 1 | 143.523 | 181.658 | 1.2659 |
| 2 | 140.075 | 178.385 | 1.2735 |
| 3 | 139.234 | 177.968 | 1.2782 |

The samples subjected to the above experiment were again heated at 1100° C. for 3 hours, cooled at 100° C. and measured for resistance values a second time but measurement was found impossible in each sample.

EXPERIMENTAL EXAMPLE 2

Using an alumina pipe having a purity of 99.7%, the platinum wire was heated at 1100° C. for 3 hours and the resistance values were measured a first time at 0° C. and 100° C. in the above mentioned manner. The results of the measurements are shown in Table 2 below.

TABLE 2

| Sample No | Resistance value (Ω) 0° C. | Resistance value (Ω) 100°C. | Temperature coefficient |
|---|---|---|---|
| 1 | 124.371 | 160.811 | 1.293 |
| 2 | 121.929 | 157.044 | 1.288 |
| 3 | 123.121 | 159.441 | 1.295 |

The samples subjected to the above experiment were again heated at 1100° C. for 3 hours, cooled at 100° C. and measured for resistance values a second time, but measurement was found unstable in each sample.

EXPERIMENTAL EXAMPLE 3

Using an alumina pipe having a purity of a at least 99.9%, the platinum wire was heated at 1100° C. for 3 hours and the resistance values were measured a first time at 0° C. and 100° C. in the above mentioned manner. The results of the measurements are shown in Table 3 below.

TABLE 3

| Sample No. | Resistance value (Ω) 0° C. | Resistance value (Ω) 100° C. | Temperature coefficient |
|---|---|---|---|
| 1 | 100.0002 | 138.504 | 1.38503 |
| 2 | 100.0001 | 138.499 | 1.38498 |
| 3 | 100.0003 | 138.502 | 1.38501 |

The samples subjected to the above experiment were again heated at 1100° C. for 3 hours and cooled down to 0° C., and this operation was repeated. On measurement of the resistance values after the repeated heating-and-cooling operation, it was confirmed that the initial resistance value and the resistance value at high temperatures were stable and changes in the values fluctuated only within the range between 0.0001Ω and 0.0005Ω.

In the above experiments, a platinum wire satisfying the JIS standard was used as the temperature-measuring resistance wire. However, a similar result was obtained also in case of using a platinum-rhodium wire satisfying the JIS standard.

As a result of the above experiments, it is evident that an alumina pipe having a purity of 99.5% or 99.7% cannot be used at all as a protective pipe for a pyrometer, as the temperature characteristics vary significantly during actual use. In general, contamination of platinum begins at a temperature of about 600° C. and the degree of contamination becomes more significant as the temperature becomes higher. Accordingly, if the temperature is repeatedly elevated or depressed, the properties of the platinum wire will gradually be changed to the extent where the measurement of the resistance value becomes impossible or breakdown of the wire occurs.

It is therefore quite surprising that a difference in purity of the alumina pipe only by 0.2% brings about a remarkable improvement in measurement of the resistance value of the platinum wire and prevents contamination of the platinum wire, thereby stabilizing temperature characteristics.

Figure 5:
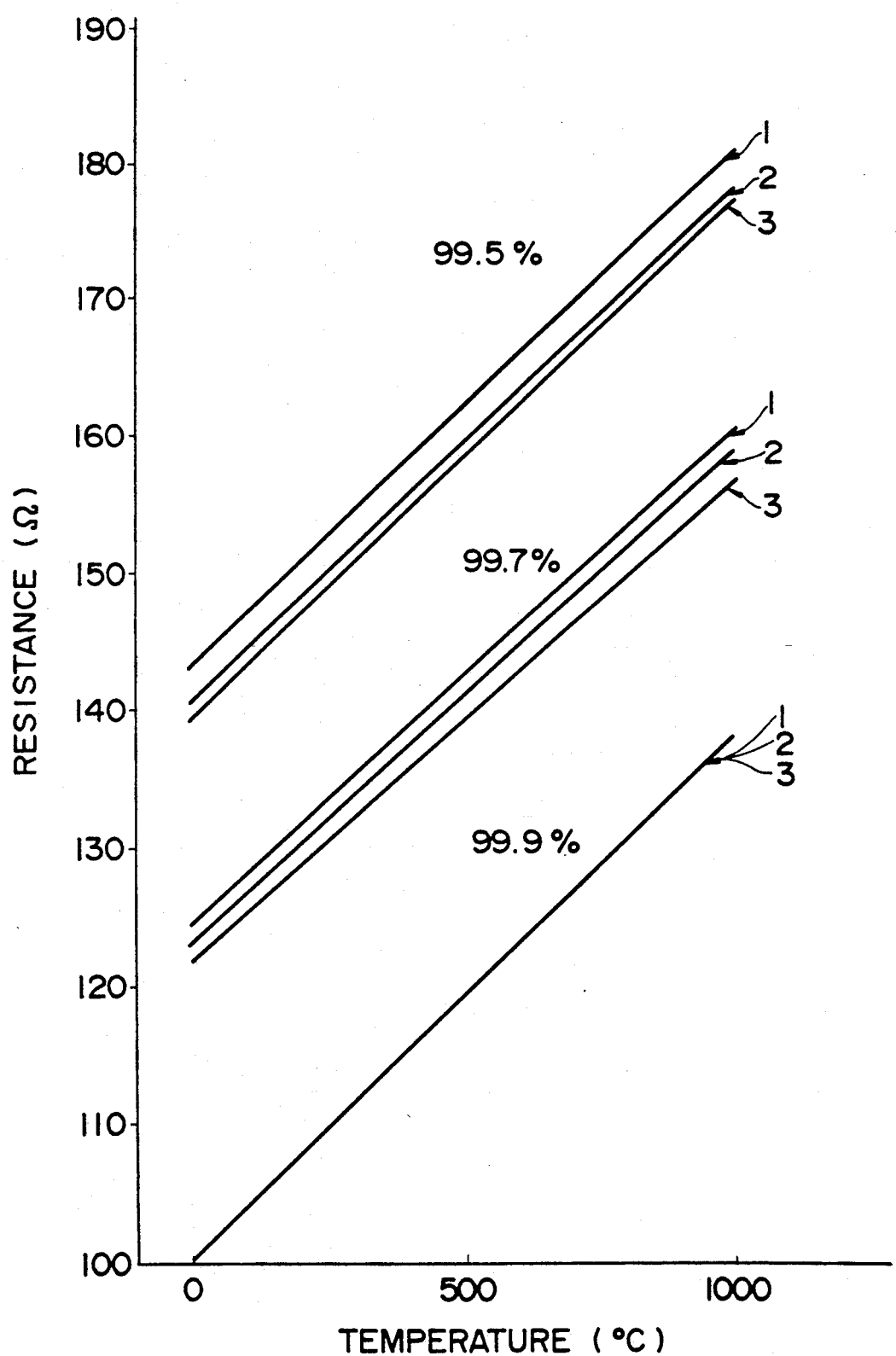
FIG. 5 is a graph showing the relation between the resistance and the temperature obtained in Experimental Examples 1-3 wherein the temperature coefficient was measured with a platinum wire in a protective pipe made of aluminas having various purities.

FIG. 5 is a graph showing the relation between the resistance value and the temperature obtained in Experimental Examples 1-3, wherein the abscissa stands for the temperature in terms of centigrade while the ordinate represents the resistance value in terms of ohms. The three lines for alumina pipe having a purity of 99.5% or 99.7% represent, respectively the three samples (Sample Nos. 1-3). That only one line is shown for the alumina pipe having a purity of at least 99.9% means that the measured values for the three samples are substantially identical.

In the prior art manufacture of a high precision platinum temperature-measuring resistance element, one resistance wire cannot be connected to another resistance wire by welding to form a circuit having a given resistance value, for the reason that the characteristics of the platinum may be significantly changed. As described above, however, an alumina pipe having a high purity of at least 99.9% is well compatible with platinum wire and does not evolve a contaminant gas on welding. According to this invention, it is now possible for the first time to manufacture a high precision platinum temperature-measuring resistance element without contaminating the platinum and without damaging the characteristics of the platinum.

A high precision pyrometer must have no error in its temperature reading, or if it has an error, the error must be small as possible. Further, it must maintain its accuracy on repeated use. Accordingly, a stability test is indispensable for satisfying these demands. In a series of stability tests of ten samples of the platinum temperature-measuring resistance elements, the deviation in measured temperature was within the range from 0.0000° C. to 0.0003° C. when the samples were heated at 1200° C. for 6 hours and the measurement was made at the triple point of water (0.01° C.). Concerning stability, the relevant JIS standard requires that "the temperature-measuring portion of the temperature-measuring resistance element to be tested be maintained at the maximum temperature of the temperature range intended for actual use, and before or after this test the temperature-measuring portion is tested in a freezing point tester to obtain any change in error at 0° C.". The values in this case are defined as 0.15° C. for the Class A stability and as 0.3° C. for the Class B stability. As defined by the JIS standard, the stability of the platinum temperature-measuring resistance element of this invention is indeed excellent. Accordingly, the element of this invention can be said to be high a precision platinum temperature-measuring resistance element.

As the pyrometer of this invention is characterized by the use of a holding portion and a protective pipe made of alumina having a high purity of at least 99.9%, the pyrometer can be used repeatedly for measuring high temperatures without any contamination of the platinum or platinum-rhodium wire. In the pyrometer of this invention, fluctuation in resistance values caused by contamination of the temperature-measuring resistance element is never observed. Accordingly, the resistance values measured at high temperatures are stable.

Another advantage of he pyrometer of this invention is its resistance to deterioration due to rapid heating and cooling and toleration of such thermal shocks for an extended period of time. Yet another advantage is that the pyrometer of this invention can be manufactured at a lower cost as compared with a platinum thermocouple.

It is of advantage that an alumina pipe having a high purity of at least 99.9% can be fused without the aid of any binder, especially in view of the fact that an alumina pipe of such a high purity could not be fused in the prior art in the absence of a binder. The method of this invention may be applied, in addition to the manufacture of a protective pipe for a pyrometer, to close a terminal end of an alumina pipe for various other purposes.

What is claimed is:

1. A pyrometer which comprises a temperature-measuring resistance element, a protective sheath surrounding said resistance element and means provided in the sheath for fixing said resistance element therein, said temperature-measuring resistance element being in the form of wire consisting essentially of platinum or platinum-rhodium and said means for fixing and said protective sheath consisting essentially of alumina having a purity of at least 99.9%, whereby said temperature measuring resistance element is substantially protected by said sheath against any contaminant evolved as the sheath is heated during temperature measurement.

2. A pyrometer according to claim 1, wherein a space is provided between the temperature-measuring resistance element and said protective sheath, wherein said means for fixing is a powdery material filling said space.

* * * * *